March 30, 1937.  W. W. HAMILL  2,075,714
ANCHORAGE
Filed Dec. 4, 1934  2 Sheets-Sheet 1
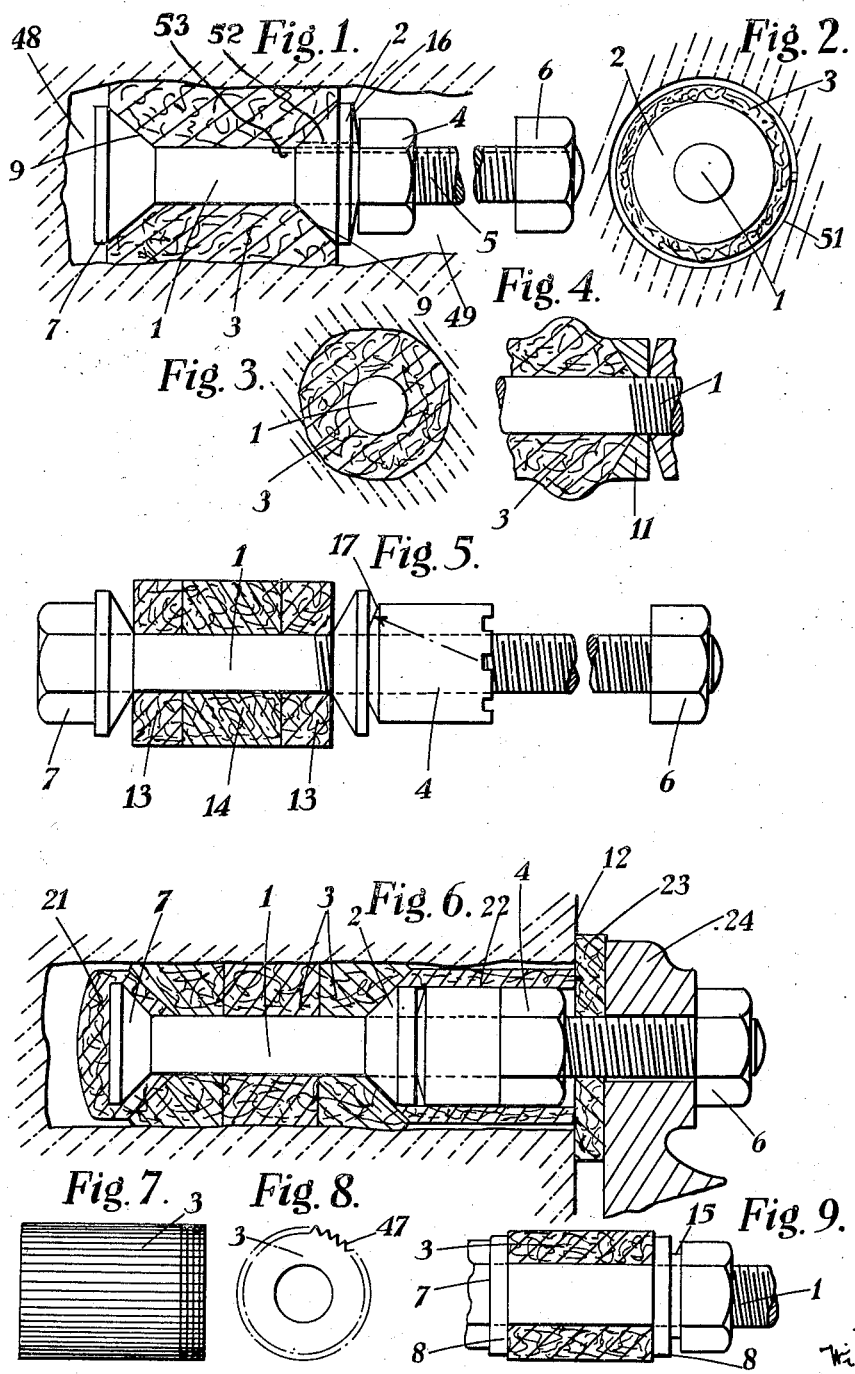
INVENTOR
William W. Hamill
BY
ATTORNEY March 30, 1937.  W. W. HAMILL  2,075,714
ANCHORAGE
Filed Dec. 4, 1934   2 Sheets-Sheet 2
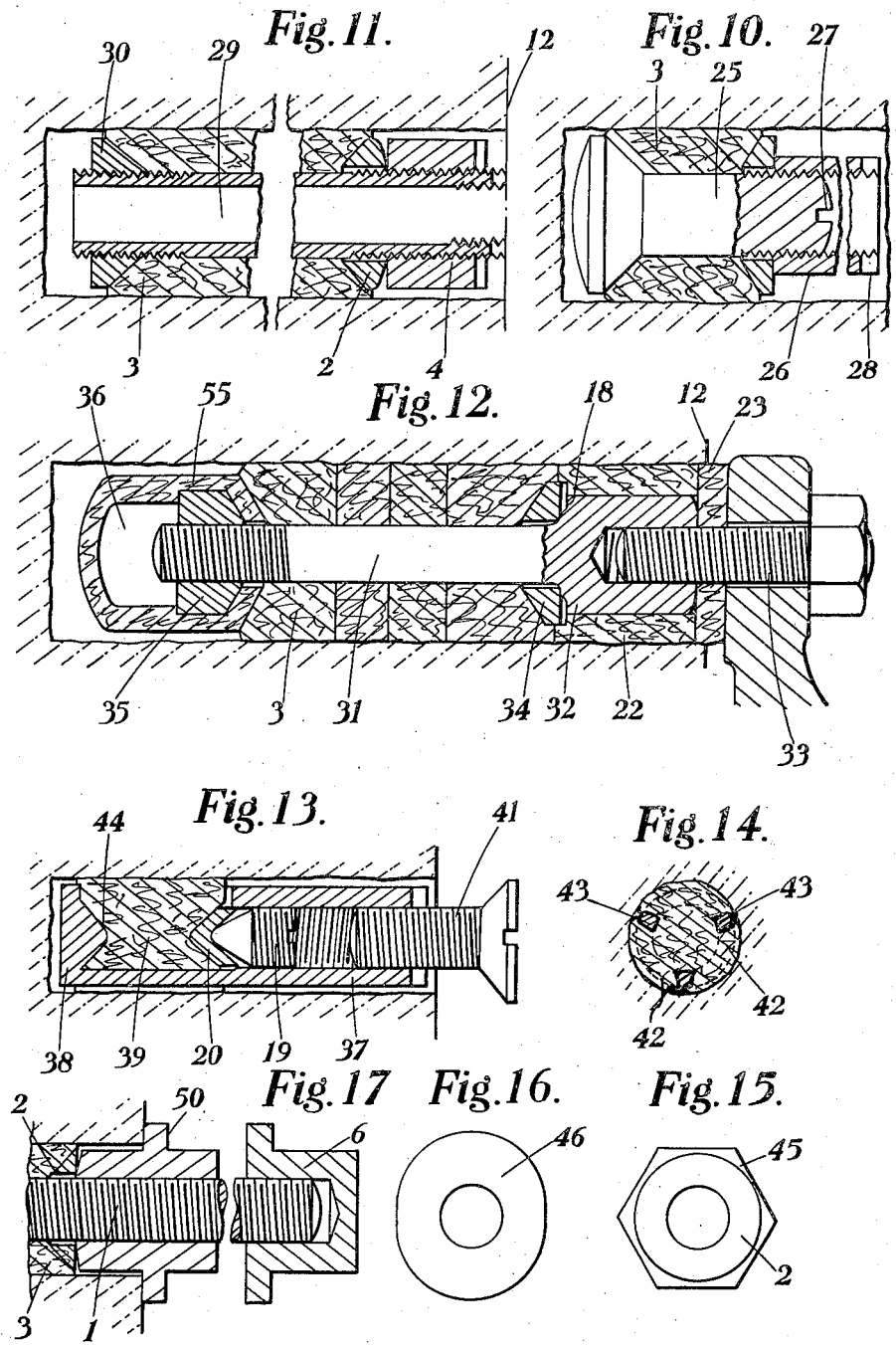

Patented Mar. 30, 1937

2,075,714

UNITED STATES PATENT OFFICE 2,075,714

ANCHORAGE

William Wilson Hamill, Four Oaks, England

Application December 4, 1934, Serial No. 755,921
In Great Britain December 8, 1933

12 Claims. (Cl. 85—2.8)

This invention relates to means for attaching objects to or supporting them from walls, floors, ceilings, and other places.

An object of the invention is an anchorage means which includes an expansible medium having a high elastic flow or deformation below the yield point; another object is to allow the unit pressure applied to the bore of the wall or other cavity to be varied from low unit pressures for soft or frangible emplacements to higher unit pressures for harder and stronger emplacements such as concrete or stone; another object is an expansible medium which has a cushioning action with inherent damping; another object is an expansible medium which absorbs vibration and prevents or minimizes noise transmission; another object is an anchorage means which can be readily removed from the cavity without damaging the expansible medium and can if desired be re-inserted many times; another object is an anchorage means which includes an expansible medium having a high dielectric value, which is non-hygroscopic, and which can be used in damp walls and other damp places without losing its electrical insulating property; another object is an anchorage means which can be fabricated by known industrial processes in a particularly economical manner; another object is the provision of an expansible means which by a flow action will fit closely the irregularities in and thereby have a better grip on the bore of the cavity; another object is to embody material with an exceptionally high coefficient of friction for contact with said bore.

Having the aforesaid and other objects in view as will appear from a perusal of the following description, the invention consists in an anchorage means which comprises an anchorage member, a rubber or like element mounted in or on said member, means combined with said member for axially compressing said rubber element and thereby enlarging its periphery, and means for fixing an object to said anchorage member independent of said compressing means.

The rubber or like material having similar properties is combined with two non-flexible parts capable of relative axial movement between which members or parts the rubber sleeve or sleeves or plug is or are compressed and caused to enlarge in a radial direction to contact with and grip the peripheral walls of the cavity, reverse movement of the two non-flexible parts allowing retrogression of the plug and withdrawal of the anchorage means as a unit from the cavity. The relatively movable parts which act as abutments for the rubber are mounted on a bolt stud or sleeve which at its inner part accommodates the expanding means, and at its outer part is furnished with screw thread or flange or otherwise constructed for the attachment or fixing of objects. The anchorage member is first fixed in the cavity, and the object subsequently attached thereto.

The invention further consists in screw means for expanding the rubber element, and means by which rotative movement of said screw means is prevented from being communicated to the rubber element, so as to avoid twisting of the rubber when screwing-up.

In the drawings Figure 1 is a part sectional elevation of an anchor bolt in accordance with the present invention.

Figure 2 is an end view of the bolt of Figure 1 but with an added split metal annulus encircling the rubber sleeve.

Figure 3 is a diagrammatic view of the anchorage bolt of Figure 1 showing the manner in which the expansible sleeve fits closely the peripheral walls of an irregular wall or other cavity.

Figure 4 shows the effect of a concave end abutment on the mode of expansion of the rubber sleeve.

Figure 5 shows a series of rubber sleeves arranged end to end.

Figure 6 is a sectional view of a completely insulated and completely isolated anchor bolt.

Figures 7 and 8 show a sleeve with fluted, corrugated or serrated periphery.

Figure 9 illustrates the use of flat end abutments by which pressure is applied in a direction normal to the end faces of the rubber sleeve.

Figure 10 shows another form of anchor bolt.

Figure 11 is an arrangement wherein a tube is used for the anchorage member.

Figure 12 illustrates an embodiment in section in which the inner abutment is the relatively fixed one, and in which the core member is rotated in the operation of screwing up.

Figures 13 and 14 are sectional views of a form in which the rubber element is a plug instead of a sleeve.

Figures 15 and 16 show other cross-sections of rubber sleeve.

Figure 17 is a sectional fragmentary view of a modification having a flanged nut to seat against the wall or other face.

The embodiments in the drawings are of two kinds; one in which the inner abutment is the relatively-movable part which is moved axially; the other in which the outer abutment is the relatively-movable part.

In the simple construction shown in Figure 1, the anchored member takes the form of a headed bolt 1 whereon is slidably mounted the axially-movable collar 2 which presses on the outer end face of the rubber or like sleeve 3 when advanced by turning the nut 4 screwed on the bolt, the thread 5 of which is continued to receive a second nut 6 at the outer end of the bolt for fixing the machine or other object to the anchored bolt. Since rubber is substantially incompressible, a shortening of the sleeve by compression between the abutments will result in an enlargement of the peripheral dimension with a consequent grip on the surrounding bore of the cavity. The head 7 of the bolt constitutes the inner and relatively-fixed abutment. It will be apparent that the object can be attached or removed without affecting or disturbing the central bolt in its anchorage to the wall or other place.

Distribution of pressure along the length of the resilient element can be modified and controlled by an appropriate shaping of the contacting face of the abutments; another means is by incorporating a plurality of rubber sleeves of different degrees of hardness or softness; or by a combination of these two means. A more or less even distribution comes from flat end abutments 8 illustrated in Figure 9 which co-act with flat end faces on the rubber sleeve and transmit pressure in a direction normal thereto; when expansion of the sleeve ends is required in priority to the intermediate part, the abutments are convex preferably conoidal as at 9 Figures 1, 5 and 6 for use with sleeves having mating concave end faces, or for engagement with flat-ended sleeves 10 Figure 5; if delayed end expansion is needed, the abutments are of concave shape as at 11 Figure 4. The particular angle included by the cone, affects pressure distribution as the greater the included angle, the nearer the approach to uniform distribution of pressure set up in a radial direction. As usually the strength of the cavity against bursting is higher in the region away from the wall face or other face 12 Figure 6, it is desirable generally to employ a convex abutment at the inner end of the plug, the two abutments having different angles or radii where asymmetrical distribution is required.

According to another means for controlling pressure distribution, the plurality of expansible members are arranged end to end as exemplified in Figure 5 and are of different degrees of hardness or softness, the end sleeves 13 for instance being of a harder grade than the intermediate sleeve 14 or sleeves. This combination reduces the endwise flow or spread of the rubber over the end abutments since the flanking sleeves expand at a lower rate per unit stress than the interposed softer sleeve, although they contribute to the general increase in diameter. If desired, the initial diameter of the softer sleeve or sleeves may be in excess of that of the harder sleeve or sleeves, and two or more may be used on each side of the softer sleeve or sleeves. For convenience in manufacture and assembly to meet various requirements, the sleeves may be made in various grades of hardness and softness and in various colours to distinguish such grades, enabling an assembly to be made as desired with the expansion curve graduated from a minimum at the outer parts to a maximum towards the middle, or vice-versa.

As a corollary to the high co-efficient of friction inherent in the rubber or like sleeve, undesirable deformation through twisting may occur if the nut by which expansion is effected contacts with the end face of the sleeve. To avoid this contingency, a loose washer 15 Figure 9 is interposed between the nut and abutment or the rubber, or the frictional drag may be reduced by cutting down the frictional radius and area by several expedients. In Figure 1 the movable abutment is coned on the face 16 next to the nut; in Figure 5 the contact face 17 of the nut is of spheroidal contour; in Figure 12 the nut part is reduced in diameter; in Figure 11 the nut part is turned down to a small-diameter shoulder 18; and in Figure 13, the point of the screw 19 includes a smaller angle than does the depression in the interposed abutment 20; all these constructions being directed to a restriction of the friction surfaces to the vicinity of the thread. The nut used for expanding is a free fit on its thread to reduce the tendency to turn the adjacent abutment; or in the case of the rotatable stem type of Figure 12, the outer abutment is a free fit on the stem as well as the nut.

Standard bolts such as the hexagon-headed type of Figure 5 or the countersunk-headed type of Figure 1, in conjunction with standard nuts allow of an assembly being made at an exceedingly low cost.

For some applications it is desirable completely to shroud the metal parts with an insulating substance so that the anchorage bolt is fully insulated electrically and fully isolated against transmission or reception of vibration. Such a construction is illustrated in Figure 6 wherein is shown an anchorage bolt having covering parts of rubber or other insulating material in addition to the expansible rubber sleeves. Conveniently three extra parts are included; a closure cap 21 which fits over the head of the central anchorage bolt and insulates the end face as well as the periphery; a tube 22 which encircles the nut for expanding and also the movable abutment; and a washer 23 intermediate the held object 24 and the wall face 12, to complete the closure. Alternatively, a series of washers can be substituted for the tube 22, or the outer expansible sleeve and the tube 22 can be moulded in one structure with clearance round the nut for spanner access. The washer 23 forms a resilient cushion between the attached object and the face 12, the complete fitting being surrounded by and floated on rubber which intercepts vibration and insulates the bolt and the attached object from the cavity in which the bolt is fixed and from the wall, floor, or other surface.

A variation of the headed bolt the head of which functions as the inner and relatively-fixed abutment is shown in Figure 10 in which the bolt 25 is short, and the nut 26 for expanding is extended as a tapped socket to receive a fixing screw, the bolt having a slot 27 and the nut radial castellations 28 for use when screwing up. This modification is useful where projection from the face is undesirable, as the outer end of the socket can be flush with or below ground level or wall face.

The construction indicated in Figure 11 is in essentials similar to those above-described with the difference that the anchorage member consists of a tube 29 threaded internally as well as externally for accommodating alternatively a screw or a nut.

What I have described as the inner and relatively-fixed abutment can be embodied so as to be adjustable along the core member before insertion in the cavity and thus enable the external diameter of the rubber sleeve and the amount of projection of the core member to be pre-determined; further, rubber sleeves may be added or subtracted and the abutment adjusted accordingly to extend the range of standard components. With this object in view, the inner abutment 30 in Figure 11 is connected by screw thread with the tube 29, the fit of the thread being closer than that of the abutment next the nut 4. This kind of adjusting means is applicable to any of the other constructions described.

Another aspect of the invention embraces a stem which operates as the rotative member when screwing up, and an inner abutment which is the relatively-fixed one. A typical example is illustrated in Figure 12. The core stem 31 is screwed at its inner end to engage the inner tapped abutment 35, is provided at its outer end with a tapped head 32 forming a socket for a fixing screw 33, and has said head shaped as a hexagon or otherwise for engagement by a turning tool. Next the head is the outer abutment 34 running loosely on the core stem, which latter when turned advances into the tapped abutment 35 for expansion of the rubber sleeve. As in Figure 6, shrouding may be applied to the metal parts to insulate and isolate them completely from the cavity in which the fitting is housed. With the exception of the cap 55 (which is extended to form a pocket 36 for the protruding end of the core stem 31) the added parts of rubber or the like are similar to those in Figure 6 and are identified by the same references. The socket can be flush fitting or may project as desired according to the depth at which the fitting is placed in the cavity. This characteristic of adjustment for depth is an important advantage of the invention, as it may avoid adjustment of the relative position of the attached object. Many different combinations can be aggregated from standard bolts or stems, and standard rubber sleeves of various sizes.

While the foregoing descriptions deal with the expansible rubber anchorage means in which the expansible rubber sleeve surrounds the core in an annular formation, I contemplate constructions using a solid plug which functions in manner similar to that described. An illustration of this kind appears at Figures 13 and 14 in which a tapped metal sleeve 37 is provided at its inner end with a head 38 forming the pressure surface or inner abutment for one face of the rubber or like plug 39, the opposite face of which is engaged by the relatively-movable abutment which consists of a conoidal washer 20 with the apex next the rubber plug 39. The screw 19 for expanding is housed within the metal sleeve and is suitably shaped to receive an instrument of rotation, and similarly the fixing screw 41 is screwed into the sleeve. Adjacent the head 38 and in the periphery of the sleeve are formed a plurality of apertures through which the rubber is forced by the screw as indicated hypothetically at 24 Figure 14. In order that the peripheral frictional gripping surface of the rubber extruded through the apertures may be as large as expedient, the connecting bars 43 are made as narrow in cross-section as is practicable for strength. The inner abutment face can be coned as already described either as an integral part 44 as shown, or as a loose washer similar to 20. Either or both of the washers are reversible to vary the pressure distribution curve.

The cross-sectional shape of the rubber members is capable of considerable variation. For most applications, a circular cross-section as at Figure 3 will be the most suitable and the most economical, but polygonal shapes (a specific example being the hexagon 45 Figure 15) or irregular shapes may meet certain special requirements; an elliptical cross-section 46 Figure 16 is another alternative. The characteristic of non-circular sections is that they provide when expanded a positive resistance to rotation in addition to the frictional grip, if used in a cavity approximating to their cross-section, though the same effect may be obtained with for instance an elliptical cavity and a soft grade of rubber for the expansible sleeve. Other modifications may be made to resist turning, by shaping the peripheral surface of the rubber sleeve or sleeves to present teeth, corrugations, serrations 47 Figures 7 and 8, or other projections which merge into the body of the sleeve when expansion is complete but enhance anti-rotational grip in the initial stages. By the use of concave toothed rollers which contact with the tube as it leaves the extruding die in the process of making the rubber tube, circumferential teeth can be formed in the periphery of the sleeve, or a diamond or criss-cross pattern can be formed on the surface, to augment grip in an axial direction. The longitudinal flutes may extend far enough into the body of the sleeve so as to persist when expansion is complete and thereby constitute drainage channels where it is undesirable completely to seal the cavity.

Because of the high co-efficient of elastic deformation without fracture or permanent set possessed by rubber, it becomes possible to employ the expansible medium in wall and other cavities which have a transverse dimension at the inner part greater than at the wall face, that is, undercut, so that when expanded, a head is formed providing a positive resistance to withdrawal in an axial direction in addition to the frictional grip. The anchorage member or sleeve 37 is provided at the end remote from the head 38 with means, here shown as a screw-driver kerf 37′, to hold the sleeve against rotation during the setting of the anchorage means. This feature has a valuable advantage in practice and is illustrated in Figure 1, the inner part 48 of the cavity being wider than the outer part 49. By virtue of the said elastic flow, the roughness, irregularities, and interstices of the cavity bore, previously undesirable, become advantageous as the rubber keys into the depressions and materially augments the grip.

Suitable provision is made to prevent rotation of the anchorage member during the process of screwing up in case of a tight-fitting nut or as a precaution against dirt in the threads, such provision including spanner flats, a screwdriver slot, tommy bar holes or slots, or other known means, applied for convenience to the outer end of the anchorage member. When the stem rotates such as in embodiments of the kind shown in Figure 12, the head is similarly furnished with flats or a slot for engagement by a tool. Once the rubber begins to grip the cavity bore, the tendency to rotation arising from the action of the expanding butt progressively diminishes.

As previously mentioned, the anchorage member to which the attached object, article, or piece, is fixed, may be constructed in various ways to suit the mode of attachment, by screw thread or otherwise, for example a flange. The nut for expansion can also be similarly modified, one device shown in Figure 17 consisting of a flange integral with the nut and arranged to seat on the wall or other face 12 to support the object.

Instead of embodying the rubber sleeve or sleeves so that the rubber comes into contact with the bore of the cavity, the rubber may act as a medium for expanding a metal annulus which is thereby forced outwardly against the cavity bore as shown in Figure 2 wherein 51 indicates a split metal ring which encircles the rubber sleeve 3.

Another means for preventing rotation of the nut used for expanding the rubber sleeve or sleeves is by a key 52 Figure 1 in the axially movable abutment collar which engages a longitudinal keyway 53 in the shank of the central bolt.

When polygonal sleeves are used, they are preferably formed with an odd number of sides, or when fluted, with an odd number of flutes.

By the term rubber used herein is meant compositions known in commerce and having various kinds and proportions of drugs, fillers, and the like.

Compared with existing methods of fixing by grouting, cementing, or leading-in, such for instance as are employed for foundation or holding-down bolts, anchorages according to the invention show a material saving in waiting or setting time, since the improved means can be fixed in place as soon as the cavity is made and are immediately available as an anchoring device. Further, the ease of application or removal, the feature of adjustability for depth of cavity or protrusion or length of bolt, the possibility of variation in angular position relative to the cavity, which characterize the invention provide novel and unique features in the art.

Having described my invention, what I claim is:

1. An anchorage for walls, floors, and other places comprising an anchorage member, an abutment combined with and axially displaceable on the anchorage member, a second abutment combined with and axially immovable on the anchorage member, a rubber element intermediate said abutments and mounted in definite relation to said member, and a nut screwed on the anchorage member to press against the face of the movable abutment away from the rubber contact face, the contacting faces of the nut and the movable abutment being restricted to the vicinity of the thread to avoid twisting of the rubber through the rotary motion of the nut.

2. An anchorage for walls, floors, and other places comprising an anchorage member, an abutment axially displaceable on the anchorage member, a second abutment axially immovable on the anchorage member, a rubber element intermediate said abutments and mounted in definite relation to said member, and a nut screwed on the anchorage member to press on the face of the movable abutment remote from the rubber contact face, the contact face of the nut being bevelled or rounded to reduce frictional rotational drag on the said second abutment.

3. An anchorage for walls, floors, and other places comprising an anchorage member, an abutment axially displaceable on the anchorage member, a second abutment axially immovable on the anchorage member, a rubber or like element mounted in definite relation to said member intermediate said abutments, the face of the movable abutment away from the rubber contact face being bevelled or rounded to restrict the frictional surface, and a nut screwed on the anchorage member to contact with the bevelled or rounded face of the movable abutment.

4. An anchorage for walls, floors, and other places comprising a tubular anchorage member closed at one end and open at the other, openings in the periphery of said member adjacent the closed end thereof, a rubber or like plug inserted in the said member in the vicinity of said openings, an axially movable abutment inserted in the bore of said member to engage the adjacent face of the rubber plug, a screw thread in the bore of said member, a screw contacting with said movable abutment for compressing the rubber plug and forcing it outwardly through said openings, said screw engaging said thread, and means at the end of the said member remote from the closed end for engagement by an anti-rotation tool.

5. An anchorage for fixing objects to walls, floors and the like, comprising an anchorage member provided at one end with a fixed abutment, a rubber element on said member and engaged at one end by the fixed abutment, a second abutment held against other than axial movement on and relative to the anchorage member, and means for moving the second abutment longitudinally of the anchorage member for pressure contact with the adjacent end of the rubber element, whereby said element is expanded throughout its entire peripheral area to fix the anchorage member against movement.

6. A construction as defined in claim 1, wherein the abutments are of convex formation.

7. A construction as defined in claim 5, wherein the movable abutment is keyed on the anchorage member to permit axial movement of said abutment while preventing relative rotative movement.

8. A construction as defined in claim 1, wherein the respective abutments and means for operating the movable abutment are shrouded in insulating material.

9. A construction as defined in claim 1, wherein the rubber element is made up of independent sections having relatively different rates of expansion for unit structure.

10. An anchorage for fixing objects to walls, floors and other places formed with an opening entering from one surface thereof, comprising a rubber element of a normal diameter to be freely inserted in and removed from said opening, means operative at the respective ends of the element and acting when subjected to pressure to cause the periphery of the element to spread within the opening, and a member for subjecting said means to pressure, said means operating to restrain the respective ends of the element against spreading under said pressure whereby to permit the full intermediate peripheral portion of the element to spread freely other than by the wall of the opening.

11. An anchorage member including a rubber element made up of sections of different degrees of expansibility under pressure, and means for exerting endwise pressure on the element to cause the peripheral surface thereof to spread in proportion to the expansibility of the respective sections.

12. An anchorage member including a rubber element made up of sections with the end sections of less expansibility under endwise pressure within the intermediate section or sections, and means for creating endwise pressure on the element to compel peripheral expansion of the sections thereof in accordance with their predetermined degrees of expansibility.

WILLIAM WILSON HAMILL.